United States Patent [19]

Schmidt

[11] Patent Number: 5,306,397
[45] Date of Patent: Apr. 26, 1994

[54] PROCESS AND APPARATUS FOR THE EXTRACTION OF FRESH WATER FROM WARM SEAWATER

[75] Inventor: Edgar Schmidt, München, Fed. Rep. of Germany

[73] Assignee: PI Praktische Informatik GmbH, Munich, Fed. Rep. of Germany

[21] Appl. No.: 969,675

[22] Filed: Oct. 28, 1992

Related U.S. Application Data

[63] Continuation of Ser. No. 615,897, Nov. 20, 1990, abandoned.

[51] Int. Cl.⁵ ............................ B01D 3/10; C02F 1/04
[52] U.S. Cl. ........................................ 203/11; 159/23; 159/47.1; 159/DIG. 16; 159/DIG. 32; 159/DIG. 40; 202/160; 202/205; 202/235; 202/185.1; 203/1; 203/2; 203/21; 203/DIG. 18
[58] Field of Search ............ 202/235, 205, 160, 185.1; 203/10, 11, DIG. 18, DIG. 17, 1, 2, 21, DIG. 8, 88, 91, DIG. 9; 159/904, 23, 27.1, 47.1, DIG. 16, DIG. 32, DIG. 40, 2.1, 39, 40; 55/39, 40

[56] References Cited

U.S. PATENT DOCUMENTS

| | | | |
|---|---|---|---|
| 3,248,307 | 4/1966 | Walford | 203/11 |
| 3,344,584 | 10/1967 | Kohoe et al. | 203/11 |
| 3,347,753 | 10/1967 | Morse | 203/11 |
| 3,364,126 | 1/1968 | Gutterman et al. | 203/11 |
| 3,397,119 | 8/1968 | Bourland | 203/11 |
| 3,450,602 | 6/1969 | James | 203/11 |
| 3,783,108 | 1/1974 | Huhta-Koivisto et al. | 203/11 |
| 4,187,151 | 2/1980 | Hanning | 159/904 |
| 4,302,297 | 11/1981 | Humiston | 202/185.1 |
| 4,704,189 | 11/1987 | Assaf | 159/48.2 |
| 4,959,127 | 9/1990 | Michna | 203/DIG. 17 |

*Primary Examiner*—Virginia Manoharan
*Attorney, Agent, or Firm*—Keck, Mahin & Cate

[57] ABSTRACT

The apparatus is located almost completely under the surface of the sea. The vacua in the de-aeration and the evaporation chambers are generated by a vacuum pump and are maintained by the effects of a pressure reduction device at the inlet for warm seawater and a lifting pump at the outlet for brine. The de-aerator and the evaporator are laid out as heat exchangers and penetrated by heating tubes, which are flowed through passively by warm seawater. The immersion tube forming the steam compartment which is suspended vertically in the sea serves as a condenser. The condenser is cooled passively by cold seawater. The attachment to the bottom of the sea is performed by a single point mooring construction via an anchor chain at an anchor weight. The elevation of the water production unit is controlled automatically by means of an air chamber and an air compressor.

13 Claims, 1 Drawing Sheet

PROCESS AND APPARATUS FOR THE EXTRACTION OF FRESH WATER FROM WARM SEAWATER

RELATED APPLICATION

This application is a continuation of U.S. patent application Ser. No. 07/615,897, filed Nov. 20, 1990, now abandoned.

FIELD OF THE INVENTION

The invention is related to a process for the extraction of fresh water from de-aerated warm seawater by discontinuous one stage evaporation without active heating in a vacuum between 10 and 30 hektopascals and by condensation of the produced steam by cold seawater, and apparatus therefor.

BACKGROUND OF THE INVENTION

The patent specification DE-PS 39 38 670 describes another process and apparatus for the extraction of fresh water from seawater.

SUMMARY OF THE INVENTION

The invention aims at improving the process and the apparatus of the state of the art, in a way that a great number of auxiliary devices considered as necessary can be omitted and the apparatus can be simplified.

This is achieved in the invention by running the water production unit entirely under water and causing the seawater drift near the surface and the movement of the waves to supply the process directly with vaporization heat in the form of warm seawater, and causing the seawater drift in the depth of the sea to remove heat from the process directly in order to supply the condensation process with coldness in the form of cold seawater.

In this respect, an apparatus according to the invention is distinguished by the several hundred meters long immersion tube, the de-aerator and the evaporator, all of them being placed under water, by the de-aerator and the evaporator being laid out as heat exchangers valved at the outlets of the heating tubes, in which an undirectional turbulent stream of warm seawater is produced by the drift of the sea and the wave movement, and by the immersion tube being equipped with cooling fins, which externally are exposed to the cold seawater drift and to convection.

Compared with the patent specification DE-PS 39 38 670, the invention has the following advantages:

1. Because of the favorable statics, evaporators of an arbitrary size can be used.
2. The waverider including the rising tube and the valve are not needed.
3. The hydrostatic tube including the corresponding tubing are not needed.
4. The damping chamber is not needed.
5. The blindage is not needed.
6. The water wheel is not needed.
7. The water drop shield is not needed.
8. A particular condensation chamber is not needed.
9. The water production unit has no moving parts, except those within the pumps and within the automatic controlling appliances.
10. The mooring has been simplified.
11. Under unfavorable or dangerous conditions, the water production unit can be made to descend in the sea by flooding of the air chamber and vice versa can also ascend again.

BRIEF DESCRIPTION OF THE DRAWINGS

An example for the realization of the invention shall now be explained in more detail with reference to the attached drawings.

DETAILED DESCRIPTION OF THE PREFERRED EMBODIMENTS

Figures 1, 2:
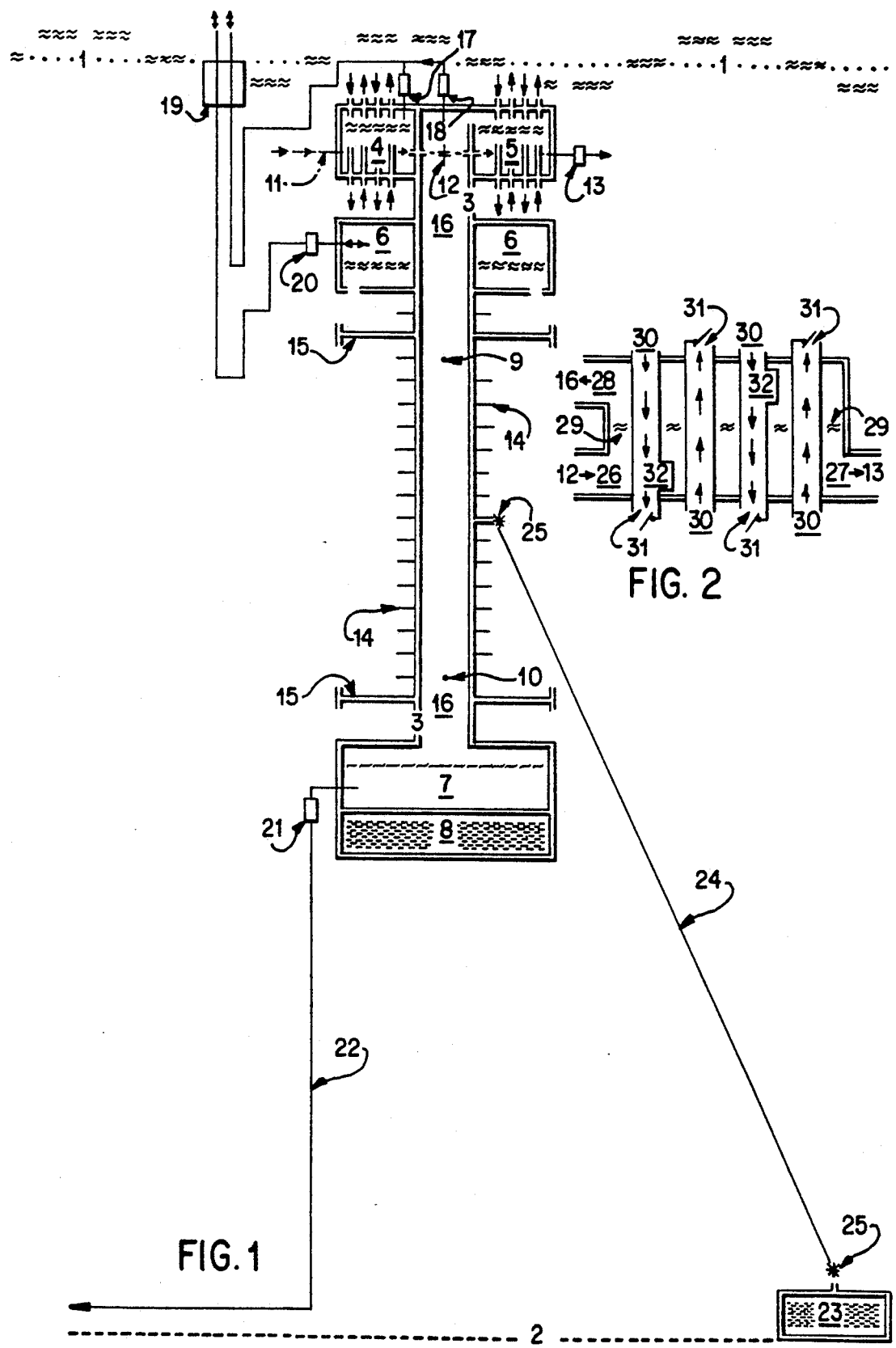
FIG. 1 is a schematic overview of the apparatus.
FIG. 2 is a detail of apparatus of the invention.

The de-aeration chamber (4) and the evaporation chamber (5) are found under the surface of the sea (1). In each of the two chambers, a vacuum is produced and maintained, which approximately corresponds to the boiling pressure of the seawater at the surrounding temperature. The de-aeration chamber (4) shows an inlet for seawater to which a pressure reduction device (11) is attached. The evaporation chamber (5) shows an outlet for brine to which a lifting pump (13) is attached. The two chambers (4) and (5) are connected via a tube with a stop-cock (12). The vacua in the two chambers (4) and (5) exist independently from one another. The pressure reduction device (11), the stop-cock (12), the lifting pump for brine (13), and the vacuum pumps (17) and (18), which are combined in one change-over vacuum pump (17)(18), are all run under automatic control. The de-aerator (4) and the evaporator (5) are laid out as heat exchangers and penetrated by heating tubes (32), which are flowed through by warm seawater by the effects of the drift and the wave movement of the surrounding seawater. The immersion tube (3) forming the steam compartment (16), which is suspended vertically in the sea, serves as the condenser. The immersion tube (3) is externally equipped with cooling fins (14) as additional heat exchanging surfaces for seawater. It is cooled by the drift of the surrounding cold seawater and by convection. The attachment of the water production unit to the bottom of the sea is performed by a single point mooring construction via an anchor chain (24) at an anchor weight (23). The attachment (25) of the anchor chain (24) to the immersion tube (3) is made about in the middle between the buoyancy point (9) and the center of gravity (10) of the water production unit. Consequently, with any deviation of the immersion tube (3) from the vertical line counteracting torques occur. Vertical oscillations of the water production unit are damped by horizontal damping wings (15), which are attached to the immersion tube (3), insofar as such oscillations are not yet absorbed by the anchor chain (24). The automatic elevation control of the water production unit is achieved with the help of an air chamber (6) with variable air volume. At the inlet of the air chamber (6) an automatically controlled air compressor (20) is attached, which receives the air via a tube from the free atmosphere. On the upper end of this tube a buoy (19) is attached. The air can also be released from the air chamber (6) via the tube.

CONSTRUCTION OF THE APPARATUS

An example of the apparatus is shown schematically in FIGS. 1 and 2. FIG. 1 also shows the surface (1) and the bottom (2) of the sea. The water production unit consists of a several hundred meters long immersion tube (3) vertically suspended in the sea, which on its upper end has a de-aeration chamber (4), an evaporation chamber (5) and an air chamber (6), on its lower end a fresh water chamber (7) and below it a weight (8), and the parts fixed with (3) to (8). The apparatus as a whole consists of the water production unit, the buoy (19) with the corresponding tubing, the pipeline for fresh water (22) and the attachment (23) to (25). In FIG. 1, the buoyancy point (9) and the center of gravity (10) are marked. At the inlet of the de-aeration chamber (4) a pressure reduction device (11) is shown which is laid out as a stop-cock to be opened and closed by automatic control. The de-aeration chamber (4) is connected with the evaporation chamber (5) via a tube, in which another such stop-cock (12) is placed. At the outlet of the evaporation chamber (5) a lifting pump for the brine (13) is attached. At the immersion tube (3) cooling fins (14) and damping wings (15) are attached. The steam compartment (16) mainly consists of the inner part of the immersion tube (3). A vacuum pump (17) has its inlet in the de-aeration chamber (4) and its outlet via a tube in the open atmosphere at the buoy (19). A vacuum pump (18) has its inlet in the steam compartment (16) and its outlet via a tube in the open atmosphere at the buoy (19). The vacuum pumps (17) and (18) can be realized by only one change-over vacuum pump (17) or (18). An air compressor (20) has an inlet in the open atmosphere via a tube carried by a buoy (19) and an outlet in the air chamber (6). A hauling pump for fresh water (21) has an inlet in the fresh water chamber (7) and an outlet towards the pipeline for fresh water (22). The pipeline for fresh water (22) can be laid out on the bottom of the sea (2) and in this case leads to a reservoir on the coast. The pipeline for fresh water (22) can be laid towards the buoy (19) and in this case, leads to a floating reservoir which can be docked on and off and in its filled state, will be dragged away. The electrical leads and the data lines are not indicated in FIG. 1. These connections can be led to the current supply on the coast and to a process computer respectively. But an electrical generator and the process computer can also be located directly at the water production unit. The attachment of the water production unit to the bottom of the sea consists of an anchor weight (23), an anchor chain (24), and linking mechanisms (25) on both ends of the anchor chain. FIG. 2 shows a more detailed schematic drawing of the evaporator (5) which is laid out as a heat exchanger. FIG. 2 shows the inlet (26) for the de-aerated seawater, the outlet (27) for the brine, the exit (28) of the evaporator (5) towards the steam compartment (16), and the surface of the seawater (29) within the evaporator. The inlet openings (30) for warm seawater from the vicinity of the evaporator (5) and the outlet openings (31) for seawater together with their valves are shown in FIG. 2. Heating tubes (32) connect these inlet and outlet openings. The heating tubes (32) are shown only in the vertical direction in FIG. 2. But the other two directions of the three-dimensional space are also foreseen. The de-aeration chamber (4) is constructed as a heat exchanger similar to the evaporator chamber (5). But contrary to the evaporation chamber (5), the de-aeration chamber (4) has no exit to the steam compartment (16). Also, at the inlet (26), instead of the tube with the stop-cock (12), the pressure reduction device (II) is positioned, and at the outlet (27) instead of the lifting pump for the brine (13) the tube with the stop-cock (12) is positioned.

FUNCTIONS OF THE APPARATUS

De-aeration: The air components dissolved in the seawater are removed to the greatest extent before the evaporation. At first, the atmospheric air prevailing in the de-aeration chamber (4) is evacuated by means of the vacuum pump (17). Then, the pressure reduction device (11) is opened. Warm seawater affected with dissolved air enters into the de-aeration chamber (4). As soon as enough warm seawater has entered into the de-aeration chamber (4) the pressure reduction device (11) is shut. In the de-aeration chamber (4), the dissolved air components drop out in the form of bubbles from the warm seawater and are suctioned away by the vacuum pump (17), except for a rest being ineffective for the following evaporation process. When the pressure in the de-aeration chamber (4) has decreased below the boiling pressure of the warm seawater the vacuum pump (17) is switched off. The de-aerated seawater is passed into the formerly evacuated evaporation chamber (5) by opening the stop-cock (12) positioned in the tube between the de-aerator (4) and the evaporator (5). To this end a little over-pressure is applied in the de-aeration chamber (4) via the vacuum pump (17).

Evaporation: A vacuum is produced in the steam compartment (16) by the vacuum pump (18). The steam compartment (16) continues as far as the upper part of the evaporation chamber (5). The vacuum produced is there below the evaporation pressure of the de-aerated seawater. As a consequence, evaporation appears there with a simultaneous temperature decrease. The evaporator (5) is laid out as a heat exchanger with a turbulent water stream in the heating tubes (32) and with convective heat transfer. The temperature decrease is compensated by the heat transfer and the evaporation process continues. By this, the salt content of the de-aerated seawater increases gradually and the evaporation process is weakened. This is compensated by an automatically controlled pumping off of the brine with the lifting pump for the brine (13) and by subsequent refilling of the evaporation chamber (5) with new de-aerated seawater via the tube (12).

Condensation: The immersion tube (3) is equipped with cooling fins (14) and has a length of several hundred meters and reaches a depth of the sea in which the seawater is significantly cooler than near the surface. At the inner surface of the immersion tube (3), condensation of the steam appears by which the condensate drops off as fresh water. The fresh water accumulates in the fresh water chamber (7). The arising condensation heat is conducted outwards via the immersion tube (3) equipped with cooling fins (14). The immersion tube (3) is cooled by the drift streaming along and by convection.

Transportation of fresh water: With the help of the automatically controlled fresh water hauling pump (21), the fresh water is pumped via the fresh water pipeline (22) into a reservoir.

Electrical leads: The electrical energy is either received from the current supply on the coast or produced in an electrical generator suitably attached to the water production unit. An electrical network supplies the pumps and the automatic control appliances. A process computer serves for automatic process control and for supervision. Another electrical network serves for the transmission of data.

Attachment: The attachment of the water production unit to the bottom of the sea is performed by single point mooring via an anchor chain (24) at an anchor weight (23) with linking mechanisms (25) on both ends of the anchor chain (24). The water production unit being considered as rigid is able to oscillate and is stimulated to perform oscillations on its upper end by the wave movement. But because of the inertia of the water production unit, this stimulation causes only moderate oscillations, which are irrelevant for the operation. The linking mechanism (24) at the water production unit is found about in the middle of the buoyancy point (9) and the center of gravity (10). With any deviation of the water production unit from the vertical line counteracting torques occur. Damping wings (15) attached to the immersion tube (3) damp the vertical oscillations by shifting the resonance frequency of the water production unit towards smaller frequencies.

Automatic elevation control: The elevation of the water production unit is actively automatically controlled by means of an air chamber (6) and an air compressor (20).

I claim:

1. Apparatus for extraction of fresh water from seawater comprising an elongated water producing unit including a long immersion tube to be totally submerged vertically oriented in ambient sea water with its top adjacent the surface and its bottom in the colder sea water drift;
   a closed deaeration chamber having an inlet and outlet mounted at the upper end of the long immersion tube;
   a pressure reduction means for controlling seawater passing into the inlet of the deaeration chamber;
   an evaporation chamber having an inlet connected to the outlet of the deaeration chamber and an outlet mounted at the upper end of the long immersion tube and being open at its upper end to the interior of the long immersion tube;
   a lift pump connected to the outlet of the evaporation chamber to remove seawater therefrom;
   control means for controlling flow between the deaeration and evaporation chambers;
   heat exchange means for heat interchanging seawater with said deaeration and evaporation chambers;
   buoyancy means for maintaining the water-producing unit at preselected orientation in ambient seawater closely adjacent to the surface thereof with the long immersion tube extending downwardly into the colder seawater drift;
   anchoring means for holding the water producing unit intermediate its centers of gravity and buoyancy;
   collection means located at the bottom of said long immersion tube for collecting fresh water evaporated from seawater in said evaporation chamber;
   vacuum means for controlling the pressure in the deaeration and evaporation chamber; and
   controlling means for sequentially evacuating the deaeration chamber and admitting seawater therein to deaerate same, admitting deaerated seawater to the evaporation chamber and evaporating same therein to cause water vapor to pass into the top of the long immersion tube, condense on its interior surface and be collected in the collection means and evacuating seawater from the evaporation chamber.

2. Apparatus according to claim 1 wherein cooling fins are fitted onto the long immersion tube.

3. Apparatus according to claim 1 wherein damping means are mounted on the long immersion tube for damping the apparatus.

4. Apparatus according to claim 1 wherein the anchoring means is a single point moor.

5. Apparatus according to claim 1 wherein the buoyancy means includes an air chamber mounted on the tube and means for controlling the air pressure in said air chamber.

6. Apparatus according to claim 1 wherein the heat exchange means includes heat exchange ducts passing through said chambers.

7. Apparatus according to claim 6 wherein the heat exchange ducts are selectively valved and divided into two seats to control flow of sea water i two vertical directions.

8. A method of extracting fresh water from seawater comprising the steps of
   (1) maintaining a long vertically oriented immersion tube in a buoyant state at a preselected level totally submerged in ambient sea water with the top of the tube closely adjacent to the surface thereof and the bottom of the tube extending downwardly into the colder sea water drift;
   (2) introducing ambient sea water into a deaeration chamber and deaerating under reduced pressure;
   (3) introducing the deaerated sea water into an evaporation chamber at reduced pressure to cause evaporation;
   (4) transferring evaporated water vapors into the top of the long vertically oriented immersion tube;
   (5) condensing transferred water vapors to transform to water;
   (6) collecting water at the bottom of the long immersion tube;
   (7) indirectly heat exchanging ambient sea water with the sea water in the chambers;
   (8) cooling the immersion tube; and
   (9) damping the immersion tube.

9. The method of claim 8 wherein the buoyancy of the tube is controlled in the sea water using compressed air.

10. The method of claim 8 wherein the submergence of the tube is controlled by a single point mooring connected to the tube between its centers of buoyancy and gravity.

11. The method of claim 8 wherein the sea water in the evaporation chamber is pumped out responsive to reaching a predetermined salt concentration.

12. The method of claim 8 wherein step (7) is effected by controlling vertical flow of ambient sea water in both up and down directions.

13. The method of claim 8 wherein the further step is included of sequentially controlling steps (2) and (3).

* * * * *